(12) United States Patent
Wilson

(10) Patent No.: US 8,201,483 B2
(45) Date of Patent: Jun. 19, 2012

(54) POWER SAW MITER GUIDE

(76) Inventor: Kelce Steven Wilson, Murphy, TX (US)

( * ) Notice: Subject to any disclaimer, the term of this patent is extended or adjusted under 35 U.S.C. 154(b) by 0 days.

(21) Appl. No.: 12/819,194

(22) Filed: Jun. 19, 2010

(65) Prior Publication Data
US 2010/0251870 A1 Oct. 7, 2010

Related U.S. Application Data

(63) Continuation of application No. 11/607,763, filed on Dec. 1, 2006, now Pat. No. 7,757,592.

(51) Int. Cl.
B26D 7/04 (2006.01)
(52) U.S. Cl. ............................ 83/468.4; 83/745; 83/581
(58) Field of Classification Search ............... 83/435.15, 83/468.4, 574, 745, 438, 444, 449, 581, 468.2, 83/468.3, 471.2, 471.3
See application file for complete search history.

(56) References Cited

U.S. PATENT DOCUMENTS

| | | | | |
|---|---|---|---|---|
| 3,124,175 A | * | 3/1964 | McCloud | 33/443 |
| 3,485,275 A | | 12/1969 | Boudreau | |
| 4,051,759 A | * | 10/1977 | Oliff | 83/471.3 |
| 4,054,077 A | * | 10/1977 | Gram | 83/745 |
| 4,079,648 A | * | 3/1978 | Chappell | 83/490 |
| 4,328,728 A | * | 5/1982 | Ferdinand et al. | 83/471.3 |
| 4,651,606 A | | 3/1987 | Hurwitz | |
| 4,784,192 A | | 11/1988 | Raggioti | |
| 4,840,097 A | | 6/1989 | Campbell | |
| 4,909,111 A | * | 3/1990 | Noble | 83/397 |
| 4,920,845 A | | 5/1990 | Blanchette | |
| 4,995,288 A | | 2/1991 | DellaPolla | |
| 5,226,345 A | | 7/1993 | Gamble | |
| 5,605,330 A | | 2/1997 | Huang | |
| 5,664,612 A | | 9/1997 | Klemma | |
| 5,910,975 A | | 6/1999 | Floyd | |
| 5,983,767 A | * | 11/1999 | DeFelice et al. | 83/745 |
| 6,401,922 B1 | | 6/2002 | Svetlik | |
| 7,159,498 B2 | * | 1/2007 | Stewart | 83/745 |
| 2006/0053992 A1 | | 3/2006 | Williams | |
| 2006/0112806 A1 | | 6/2006 | Stewart | |
| 2008/0127790 A1 | | 6/2008 | Wilson | |

FOREIGN PATENT DOCUMENTS

GB 2185436 A * 7/1987

OTHER PUBLICATIONS

"Accurate Cut Sawbox", printed from http://www.canadianhomeworkshop.com/weekend/sawbox.shtml on May 13, 2006.

* cited by examiner

Primary Examiner — Kenneth E. Peterson
Assistant Examiner — Jennifer Swinney
(74) Attorney, Agent, or Firm — Kelce S. Wilson

(57) ABSTRACT

Operating a power saw between a pair of parallel guide rails, which engage opposing sides of saw base plate to constrain the motion of the saw to a straight path, allows for precise cuts. A set of two or more fences allows for multiple cutting options. In some embodiments, non-parallel fences coupled to the guide rails allow for precise cuts at more than just a single angle. In some embodiments, two fences may engage opposing sides of the object to be cut simultaneously, holding the object more securely with respect to the guide rails than would a single fence. A possible clamping force holding the two fences against the object allows the miter guide to remain fixed relative to the object so that the user's hand may be freed for another task, such as holding the saw with both hands.

6 Claims, 4 Drawing Sheets

POWER SAW MITER GUIDE

RELATED APPLICATIONS

This is a continuation of U.S. patent application Ser. No. 11/607,763, filed Dec. 1, 2006, now U.S. Pat. No. 7,757,592 issued Jul. 20, 2010 and claims priority thereto.

TECHNICAL FIELD

The invention relates generally to woodworking and industrial power tools, and more particularly, to providing a cutting guide for a hand-held power saw.

BACKGROUND

Miter boxes are cutting guides that allow precision cuts using hand-held saws, because they both constrain the saw to move in a straight line and also align the cutting path with respect to the object being cut. Typical miter boxes are designed for hand-operated saws, and include cutting guides for 90-degree cross cuts, as well as 45-degree miter cuts. The cutting guides in a typical miter box are usually pairs of notches on opposing sides of the box, barely wider than the saw blade, and which are oriented at a precise angle with respect to the box's inner surfaces. These surfaces are a cutting surface, which the blade will score as it cuts through the object, and at least one other alignment surface, which may be identified as a fence. A miter box typically forms a 3-sided trough with a cutting surface at the bottom, and two fences protruding above the cutting surface. The notches are in the fences.

An object to be cut is placed on the cutting surface and held firmly against a fence. The saw blade is then placed in a set of notches, and the user may cut the object by sliding the saw blade back and forth within the notches. The notches work well for guiding hand-operated saws, because the blade spans the width of the miter box and is held in place by both notches. Further, the cutting edge of the blade only engages the object to be cut and the cutting surface. That is, the cutting edge of the blade does not contact the fences.

A typical miter box will not work with a common hand-held power saw, because the blade will not be held in place by both notches simultaneously when the cutting starts. Further, because the blade is circular, it will strike the distant fence and likely cut a new notch in it. For example, if an object to be cut is placed in a typical miter box, the power saw blade is set in one the notch of the first fence, and the saw is turned on, the single notch is unlikely to properly constrain the blade. As a result, as the user passes the saw through the object toward the second fence, the blade will likely engage the fence somewhere other than the pre-cut notch in the second fence. The cutting edge of the blade will then just cut a new notch in the second fence. The miter box will become damaged, and will not have achieved its purpose.

A common power tool for making precision cuts is a power miter saw. A power miter saw arrangement provides a cutting surface, typically a single fence, and a power saw attached to a precisely-oriented moving arm. The arm is allowed to move in an arc about a pivot point, and the angle of the arm motion is usually adjustable. A power miter saw allows precise cuts by guiding the blade via a calibrated arm attached to the motor and coupled to the fence.

Unfortunately, power miter saws may be expensive and heavy, and are often unsuited for some of the tasks for which a power saw is commonly used. Thus, a user may have two saws: a power saw for general cutting tasks and power miter saw for precision cuts. This duplication of power saws can be expensive and burdensome to transport to a job site.

BRIEF SUMMARY

Operating a power saw between a pair of parallel guide rails, which engage opposing sides of saw base plate to constrain the motion of the saw to a straight path, allows for precise cuts. A set of two or more fences allows for multiple cutting options. In some embodiments, two fences may engage opposing sides of the object to be cut simultaneously, holding the object more securely with respect to the guide rails than would a single fence. A possible clamping force holding the two fences against the object allows the miter guide to remain fixed relative to the object so that the user's hand may be freed for another task, such as holding the saw with both hands. The clamping force may result from one fence being adjustable, or the fences may be spaced apart to fit snugly over common sizes of pre-cut lumber.

In some embodiments, non-parallel fences coupled to the guide rails allow for precise cuts at more than just a single angle. One fence may be oriented at an angle between 59 degrees and 91 degrees with respect to the guide rails, and another fence may be oriented at an angle between 29 degrees and 61 degrees with respect to the guide rails. Because the fences are not parallel, they have a closest point on one side of the guide rails. The ends of the fences may be angled so that the end of each fence is parallel to the other fence at the closest point. Some embodiments do not require a cutting surface. That is, unlike a traditional miter box, in which the object to be cut is placed inside the box, embodiments of the invention may be placed on top of the object, with open space below the object.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
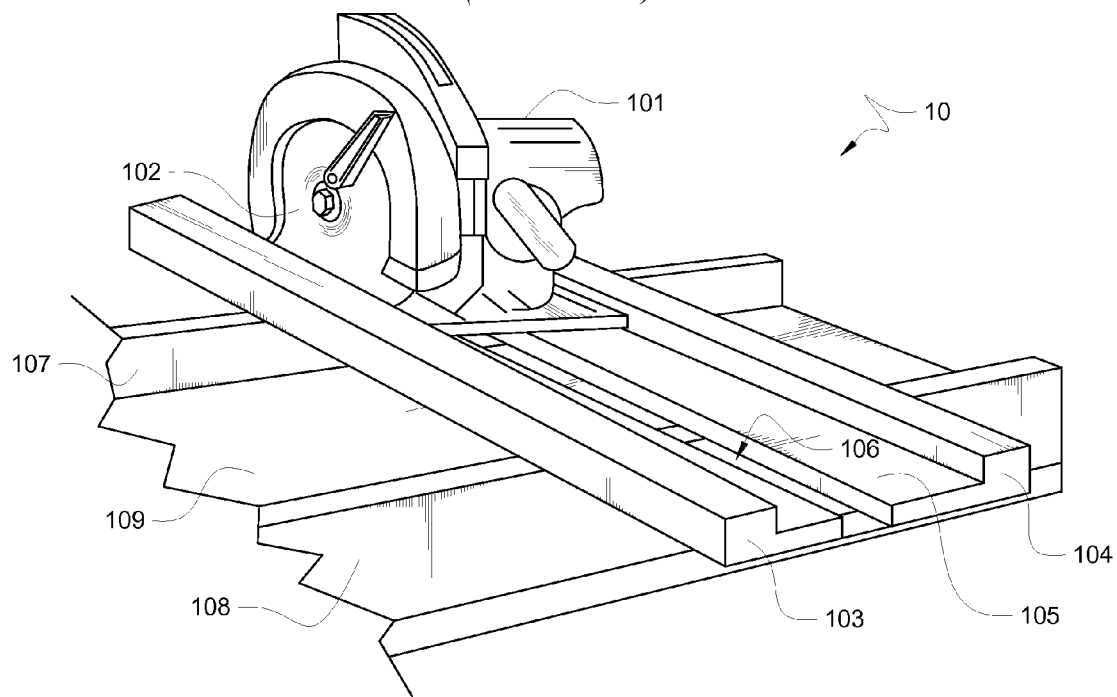
FIG. 1 shows a prior art cutting guide.

FIG. 1 shows prior art cutting guide 10 for making 90-degree cross cuts with power saw 101. Prior art cutting guide comprises guide rail 103 and 104, saw support surface 105, parallel fences 107 and 108, and cutting surface 109. Saw support surface 105 comprises notch 106 through which saw blade 102 passes when cutting an object. Because notch 106 completely separates saw support surface 105 into two pieces, each of guide rails 103 and 104 must be firmly attached to both fences 107 and 108 for structural rigidity. As a result, in the prior art device 10, fences 107 and 108 are not adjustable.

In operation, a user places an object to be cut on cutting surface 109, between fences 107 and 105, completely to the side of one of guide rails 104 and 103. The object is then slid along cutting surface 109 until the part of the object to be cut is beneath notch 106. Since the object must be able to slide along cutting surface 109, and fences 107 and 108 are not adjustable, fences 107 and 108 cannot hold the object firmly. As a result, the user must use one hand to hold the object firmly against one of fences 107 or 108 while the object is being cut. This either requires the use of an assistant, or else leaves the user only a single hand for operating the saw.

Figure 2:
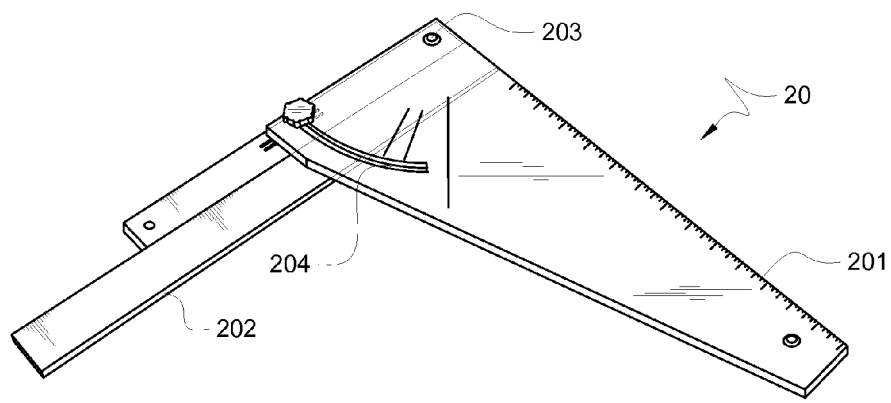
FIG. 2 shows another prior art cutting guide.

FIG. 2 shows prior art cutting guide 20 for making cuts at an arbitrary angle. Cutting guide 20 comprises a single guide rail 201 attached to a single fence 202, whereby guide rail 201 pivots about hinge 203. Adjustable arc slot 204 works with hinge 203 to allow guide rail 201 to be oriented at a range of angles with respect to fence 202. As with prior art cutting guide 10 from FIG. 1, prior art cutting guide 20 only engages the object to be cut with a single fence, requiring that object be held against prior art cutting guide 20. Further, since prior art cutting guide only has single guide rail 201 a saw may wander away from guide rail 201, resulting in an imprecise cut.

Figure 3A:
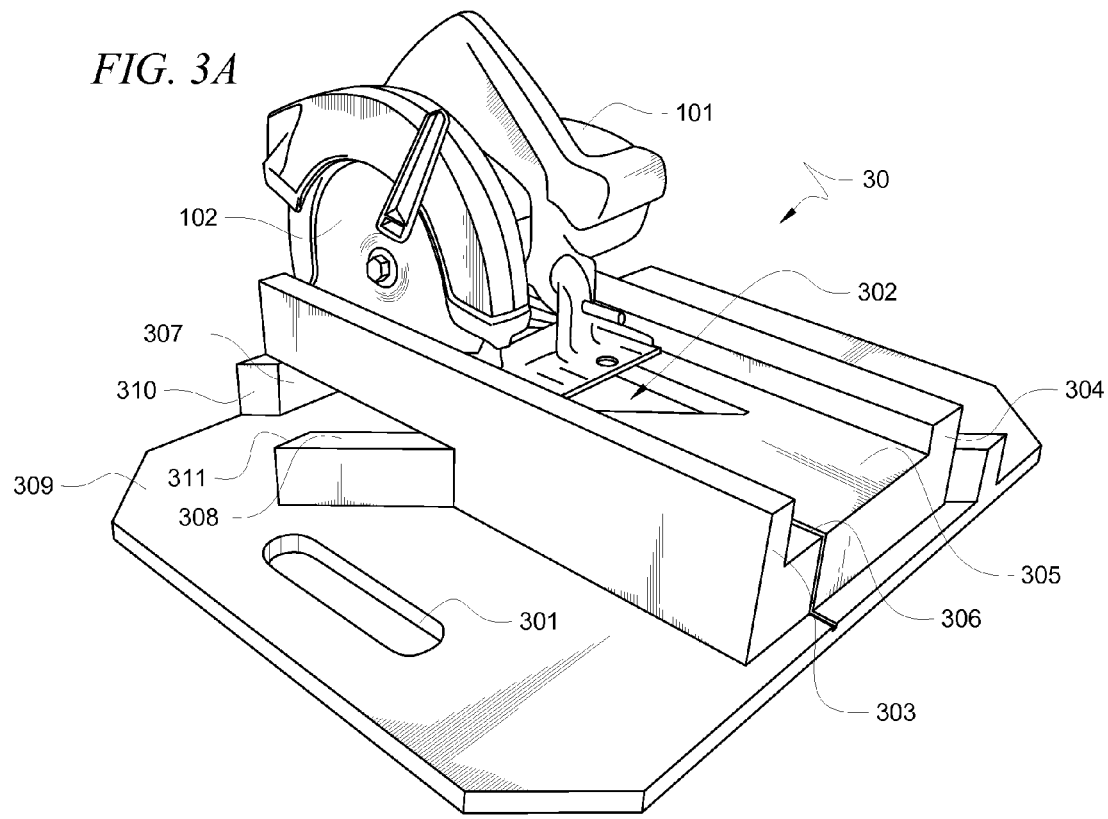
FIG. 3A shows an embodiment of a power saw miter guide.

FIG. 3A shows an embodiment of power saw miter guide 30. Power saw miter guide 30 comprises first guide rail 303, second guide rail 304, first fence 307 and second fence 308. Second guide rail 304 is oriented parallel to first guide rail 303. First fence 307 is coupled to first guide rail 303 and second guide rail 304 and is oriented at an angle between 59 degrees and 91 degrees with respect to guide rails 304 and 304. As shown in FIG. 3A, first fence 307 is oriented at an angle of approximately 90 degrees with respect to guide rails 304 and 304. Second fence 308 is also coupled to first guide rail 303 and second guide rail 304 and is oriented at an angle between 29 degrees and 61 degrees with respect to guide rails 304 and 304. As shown in the figure second fence 308 is oriented at an angle of approximately 45 degrees with respect to guide rails 304 and 304.

Guide rails 303 and 304 constrain motion of saw 101 to a straight path by engaging opposing sides of the base plate of saw 101 as saw 101 rides on saw support surface 305. Saw blade 102 passes through notch 306 to cut an object that may be set on cutting surface 309, and aligned against either fence 307 or fence 308. Window 302 in saw support surface 305 between guide rails 303 and 304 allows a user to see that the object being cut is aligned properly within miter guide 30 between fences 307 and 308. Window 302 does not span the entire distance between guide rails 303 and 304, so that a portion of saw support surface 305 is still available to support saw 101.

The arrangement of guide rails 303 and 304, fences 307 and 308 with respect to saw support surface 305 and cutting surface 309 can be seen in FIG. 3A. Saw support surface 305 and cutting surface 309 are parallel. Fences 307 and 308 are on top of cutting surface 309, and saw support surface 305 is on top of fences 307 and 308. Guide rails 303 and 304 are the above saw support surface 305. Fences 307 and 308 are thus coupled to guide rails 303 and 304 through saw support surface 305. Optional carrying handle 301 in cutting surface 309 makes miter guide 30 conveniently transportable. Alternatively, optional carrying handle 301 could be placed at any convenient location on miter guide 30.

Since fences 307 and 308 are not parallel, there is a point at which they would intersect, if they were not truncated. This arrangement could limit the length of the object to be cut, or at least limit the length that could be cut from it. As a result, unlike fences 107 and 108 of prior art cutting guide 10 from FIG. 1, fences 307 and 308 of miter guide 30 must be truncated shortly outside of guide rails 303 and 304. Fences 307 and 308 reach a closest point just outside guide rail 303. In this area, end 310 of fence 307 is parallel to fence 308, while end 311 of fence 308 is parallel to fence 307. With proper spacing, ends 310 and 311 of fences 307 and 308, respectively, could provide an extra alignment point for common sized pre-cut lumber.

For example, if the distance between ends 310 and 311 may be set so that if one side of a 2×4 piece of lumber is pressed against fence 307, the opposing side of the 2×4 could contacts end 311. Alternatively, a 2×4 pressed against 308 may also contact end 310. This arrangement will provide added stability for the object to be cut. Typical dimensions for miter guide 30 to accommodate commonly available power saws would be: the distance between guide rails 303 and 304 set between 5 inches and 7 inches, the distance between saw support surface 305 and cutting surface 309 set between 1 inch and 5 inches, and notch 306 set between 1 and 3 inches in depth.

Other dimensions may be used without departing from the spirit and scope of the invention. Further, if cutting surface 309 was eliminated, miter guide 30 would be placed on top of the object to be cut, rather than the object to be cut being placed inside miter guide 30. That is, the underside of saw support surface 305 or guide rails 303 and 304 would rest on top of the object to be cut. Fences 307 and 308 must then be taller than the depth of notch 306 at the point where notch 306 passes through fences 307 and 308.

Figure 3B:
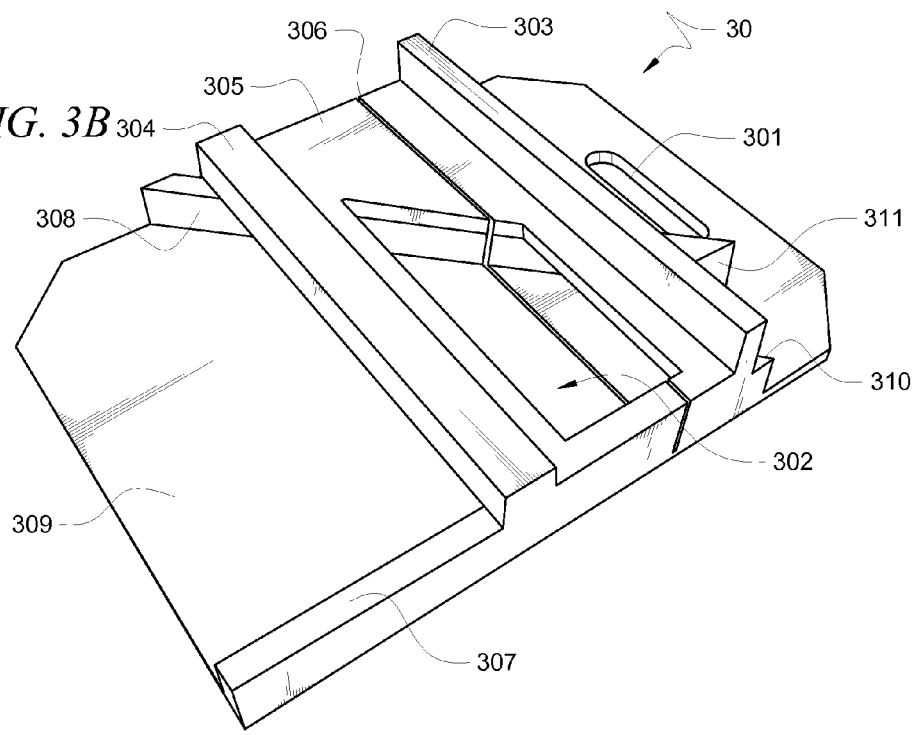
FIG. 3B shows another view of the power saw miter guide of FIG. 3A.

FIG. 3B shows another view of power saw miter guide 30, but without saw 101. The extent of window 302 between guides 303 and 304 and fences 307 and 308 is more easily seen in FIG. 3B, as well as the location where notch 306 intersects fence 308. Note that miter guide 30 allows precision cuts at two different angles, which is not possible with prior art cutting guide 10, and holds both sides of saw 101, whereas prior art cutting guide 20 cannot.

Figure 4A:
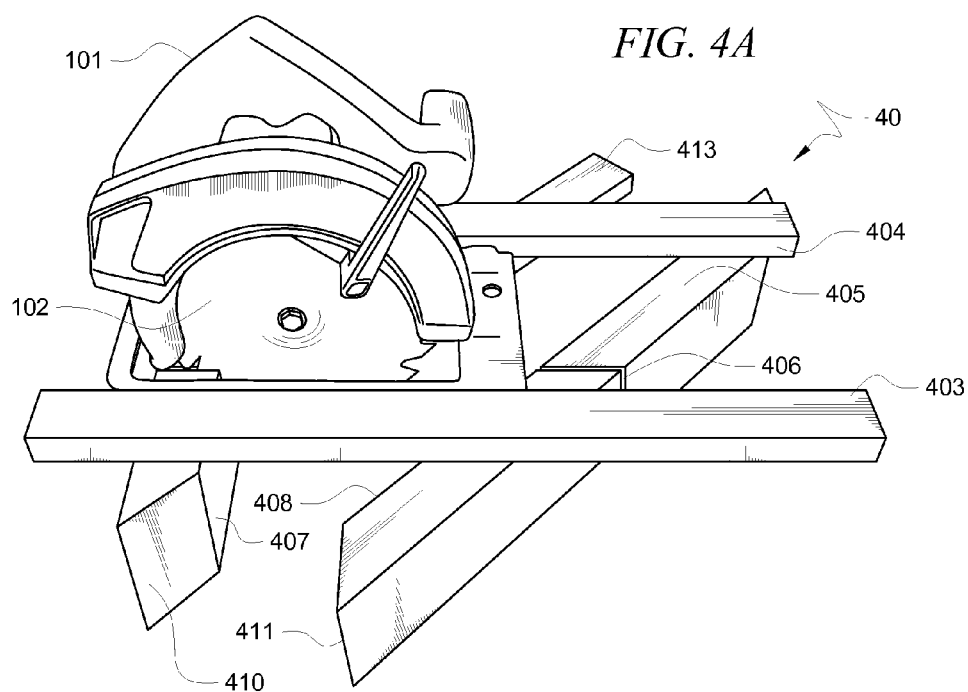
FIG. 4A shows another embodiment of a power saw miter guide.

FIG. 4A shows another embodiment of the invention as reflected in power saw miter guide 40. Miter guide 40 comprises guide rails 403 and 404, along with fences 407 and 408. Saw support surface 405 is the top surfaces of fences 407 and 408. Since there is no cutting surface, fences 407 and 408 are taller than the depth of notch 406, and notch 406 is separated into two parts. End 410 of fence 407 is parallel to fence 408, while end 411 of fence 408 is parallel to fence 407. Miter guide 40 is used by setting miter guide 40 atop the object to be cut, rather than setting the object to be cut on a cutting surface.

Figure 4B:
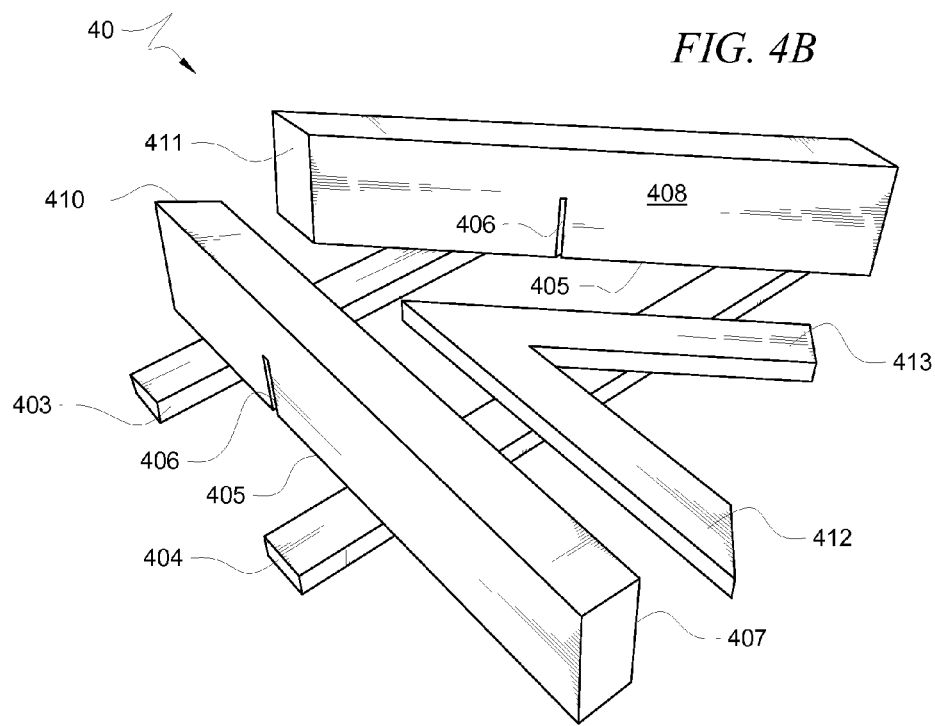
FIG. 4B shows another view of the power saw miter guide of FIG. 4A.

As can be seen from FIGS. 4A and 4B, top surfaces 405 of fences 407 and 408 are parallel and lie in a common plane with the undersides of guide rails 403 and 404.

Miter guide 40 also has two additional fences 412 and 413, both of which are visible in FIG. 4B. Fence 412 is parallel to fence 407, while fence 413 is parallel to fence 408. With proper spacing between pairs of fences 407 and 412 or 408 and 413, commonly-sized pre-cut lumber may be held firmly with respect to miter guide 40. That is, fences 407 and 412 may be set apart such that miter guide 40 fits snugly over a 2×4. Additionally, the spacing of fences 408 and 413 may be set to accommodate a common size of lumber. Typical dimensions for miter guide 40 may be a distance between fences 407 and 412 or 408 and 413 of between 1 inch and 5 inches.

Figure 5:
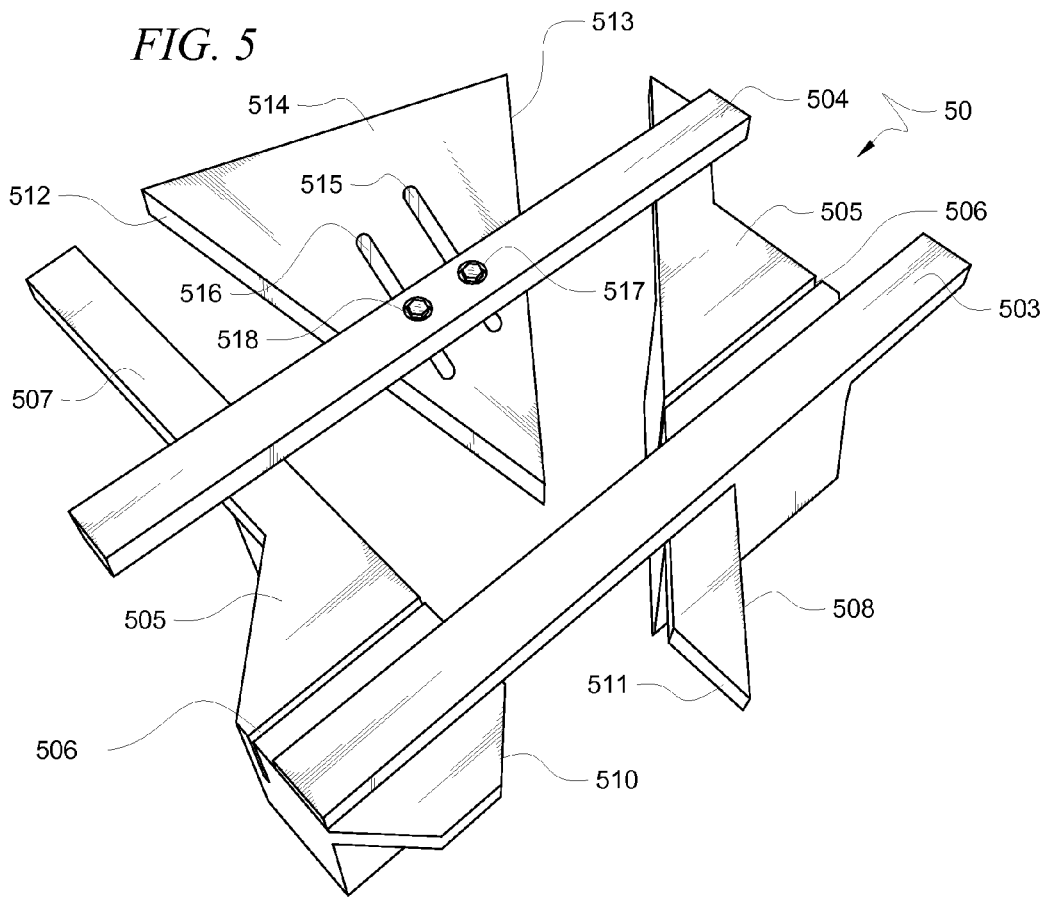
FIG. 5 shows another embodiment of a power saw miter guide.

FIG. 5 shows yet another embodiment of the invention as reflected in power saw miter guide 50. Miter guide 50 comprises guide rails 503 and 504, along with fences 507 and 508. Saw support surface 505 is the top surfaces of fences 407 and 408, along with some extensions added to improve the rigidity of miter guide 50 at the intersections of guide rail 503 with fences 507 and 508. Fences 507 and 508 are taller than the depth of notch 506. Ends 510 and 511 of fences 507 and 508, respectively, are parallel with the opposing fence, 508 and 507, respectively.

Fences 512 and 513 are two sides of adjustable fence assembly 514, where fence 512 is parallel to fence 507 and fence 513 is parallel to fence 508. Adjustable fence assembly 514 has two slots 515 and 516. Adjustment bolts 517 and 518 in guide rail 504 pass through slots 515 and 516, so that adjustable fence assembly 514 rides along an angled path with respect to both fences 507 and 508. For example, if fences 507 and 508 form a 45-degree angle, then fences 512 and 513 also form a 45 degree angle. Slots 515 and 516 then could be at a 22.5-degree angle with respect to both fences 507 and 507. This way, as adjustable fence assembly 514 moves inward, toward the closest point between fences 507 and 508, the distance between fences 507 and 512 closes. The distance between fences 513 and 508 will also close as adjustable fence assembly 514 moves inward. Conversely, as adjustable fence assembly 514 moves outward, away from the closest point between fences 507 and 508, the distances between fences 507 and 512 or 508 and 513 will increase.

In operation, miter guide 50 may be set on top of an object to be cut, and aligned using either fence 507 or 508. Adjustable fence assembly 514 is then moved so that the object is held between either fences 507 and 512 or fences 508 and 513. Adjustment bolts 517 and 518 may then be tightened so that miter guide 50 is held firmly relative to the object. Spring loaded or other flexible tension methods may alternatively be used, rather than bolts, in order to provide holding force for adjustable fence assembly 514.

Figure 6:
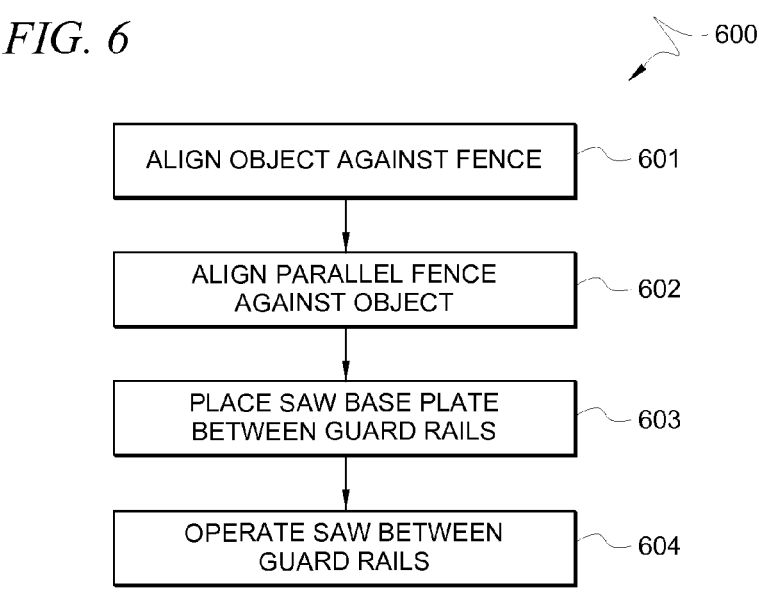
FIG. 6 shows a method for using an embodiment of a power saw miter guide.

FIG. 6 shows method 600 for using an embodiment of a power saw miter guide. In process 601, an object to be cut is aligned against a first fence. In process 602, a second fence, parallel to the first fence, is brought against the opposing side of the object. If the distance between the parallel fences is not adjustable, but is rather set to be snug against opposing sides of commonly-sized pre-cut lumber, process 602 may be nearly simultaneous with process 601. In process 603, a saw base plate is set between parallel guide rails. In process 604, the saw is operated between two parallel guide rails. The guide rails engage opposite sides of the base plate to constrain motion of the saw to a straight path.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A miter guide for a power saw, the miter guide comprising:
    a first guide rail;
    a second guide rail oriented parallel to the first guide rail, wherein the first guide rail and the second guide rail are operable to constrain motion of a power saw to a straight path, by engaging opposing sides of a base plate of the saw;
    a first fence coupled to the first guide rail and to the second guide rail and oriented at a fixed angle between 59 degrees and 91 degrees with respect to the first guide rail;
    a second fence coupled to the first guide rail and to the second guide rail and oriented at a fixed angle between 29 degrees and 61 degrees with respect to the first guide rail;
    a third fence parallel to the first fence, disposed between the first fence and the second fence; and
    a fourth fence parallel to the second fence, disposed between the second fence and the third fence;
    wherein the first fence and the second fence are both disposed on an underside of the first guide rail; wherein the first fence and the second fence comprise sides of a substantially c-shaped channel; wherein the first fence, the second fence, the third fence, and the fourth fence are all disposed on an underside of the second guide rail; wherein the underside of the first guide rail, between the first fence and the second fence, forms a portion of the substantially c-shaped channel, and wherein the third fence and the fourth fence form portions of an adjustable fence assembly, and wherein the adjustable fence assembly is configured to adjust the least distance between the first fence and the third fence as the least distance between the second fence and the fourth fence is adjusted.

2. The miter guide of claim 1 wherein the first fence is oriented at an angle of 90 degrees with respect to the first guide rail.

3. The miter guide of claim 1 wherein the second fence is oriented at an angle of 45 degrees with respect to the first guide rail.

4. The miter guide of claim 1 wherein a distance between the first guide rail and the second guide rail is between 5 inches and 7 inches.

5. The miter guide of claim 1 wherein a shortest distance between the first fence and the second fence is between 1 inch and 5 inches.

6. The miter guide of claim 1 further comprising:
    a first notch in the first fence between the first guide rail and the second guide rail; and
    a second notch in the second fence between the first guide rail and the second guide rail, wherein the first notch and the second notch are between 1 inch and 3 inches in depth.

* * * * *